(12) United States Patent
Yea et al.

(10) Patent No.: US 11,265,528 B2
(45) Date of Patent: Mar. 1, 2022

(54) METHODS AND SYSTEMS FOR COLOR SMOOTHING FOR POINT CLOUD COMPRESSION

(71) Applicant: TENCENT AMERICA LLC, Palo Alto, CA (US)

(72) Inventors: Sehoon Yea, Palo Alto, CA (US); Arash Vosoughi, San Jose, CA (US); Stephan Wenger, Hillsborough, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/917,116

(22) Filed: Jun. 30, 2020

(65) Prior Publication Data

US 2021/0006766 A1 Jan. 7, 2021

Related U.S. Application Data

(60) Provisional application No. 62/870,662, filed on Jul. 3, 2019.

(51) Int. Cl.
| | |
|---|---|
| *H04N 13/161* | (2018.01) |
| *G06T 9/00* | (2006.01) |
| *H04N 19/176* | (2014.01) |
| *H04N 19/597* | (2014.01) |
| *H04N 19/85* | (2014.01) |

(52) U.S. Cl.
CPC ........... *H04N 13/161* (2018.05); *G06T 9/001* (2013.01); *H04N 19/176* (2014.11); *H04N 19/597* (2014.11); *H04N 19/85* (2014.11); *G06T 2207/10028* (2013.01)

(58) Field of Classification Search
None
See application file for complete search history.

(56) References Cited

U.S. PATENT DOCUMENTS

2020/0204782 A1* 6/2020 Najaf-Zadeh ........ H04N 19/593
2020/0327646 A1* 10/2020 Xu ........................... G06T 5/20

OTHER PUBLICATIONS

"Continous improvement of Study Text of ISO/IEC CD 23090-5 Video-based Point Cloud Compression", 3DG, ISO/IEC JTC1/SC29/WG 11 N 18479, May 8, 2019, 140 pages.

* cited by examiner

*Primary Examiner* — Christopher Braniff
(74) *Attorney, Agent, or Firm* — Sughrue Mion, PLLC

(57) ABSTRACT

Systems and methods for decoding a video stream by at least one processor, a method includes receiving the video stream, the video stream including at least one cell; and reconstructing a cell from among the at least one cell. The reconstructing includes: obtaining a maximum difference value for each of at least one set of attribute values of the cell; and determining whether to apply a filter to the cell based on the maximum difference value of a set of attribute values of the at least one set of attribute values.

20 Claims, 7 Drawing Sheets

METHODS AND SYSTEMS FOR COLOR SMOOTHING FOR POINT CLOUD COMPRESSION

CROSS-REFERENCE TO RELATED APPLICATION

This application claims priority from U.S. Provisional Application No. 62/870,662, filed on Jul. 3, 2019, the disclosure of which is incorporated herein by reference in its entirety.

FIELD

This disclosure is directed to video coding, more specifically, point cloud compression.

BACKGROUND

Advanced three-dimensional (3D) representations of the world are enabling more immersive forms of interaction and communication. They also allow machines to understand, interpret, and navigate our world. Point clouds have been widely used as a 3D representation of the world. Several use cases associated with point cloud data have been identified, and corresponding requirements for point cloud representation and compression have been developed.

The document "Continous improvement of Study Text of ISO/IEC CD 23090-5 Video-based Point Cloud Compression", dated May 8, 2019 (ISO/IEC JTC1/SC29 WG11 N18479), is incorporated herein by reference in its entirety.

SUMMARY

Embodiments of the present disclosure may be implemented for point cloud coding technologies. Embodiments of the present disclosure provide several color transfer algorithms which can be used for any point cloud compression method including the Video Point Cloud Compression (V-PCC) and the Geometry based Point Cloud Compression (G-PCC) standards.

According to one or more embodiments, a method for decoding a video stream by at least one processor is provided. The method includes: receiving the video stream, the video stream including at least one cell; and reconstructing a cell from among the at least one cell, the reconstructing including: obtaining a maximum difference value for each of at least one set of attribute values of the cell; and determining whether to apply a filter to the cell based on the maximum difference value of a set of attribute values of the at least one set of attribute values.

According to an embodiment, the determining includes applying the filter to the cell based on the maximum difference value being less than a threshold.

According to an embodiment, values of the set of attribute values are luma values of the cell.

According to an embodiment, the at least one set of attribute values is a plurality of sets of attribute values, each set of the plurality of sets of attribute values corresponding to a different color component, the obtaining includes obtaining a plurality of maximum difference values for the plurality of sets of attribute values, respectively, and the determining includes determining a largest maximum difference value from among the plurality of maximum difference values, and whether to apply the filter to the cell based on the largest maximum difference value.

According to an embodiment, the determining includes applying the filter to the cell based on the largest maximum difference value being less than a threshold.

According to an embodiment, the determining includes selecting the filter from among a plurality of filters based on a median value of attribute values of a cell neighborhood that includes the cell that has the set of attribute values.

According to an embodiment, the determining includes selecting a filter strength of the filter based on the maximum difference value.

According to an embodiment, the filter is a bilateral filter.

According to an embodiment, the filter is a trilinear filter.

According to an embodiment, the determining includes determining to apply the filter to a current point of the cell based on both the maximum difference value being less than a first threshold and an absolute distance, between a centroid of points in the cell and the current point, being greater than a second threshold.

According to one or more embodiments, a system for decoding a video stream is provided. The system includes: memory configured to store computer program code; and at least one processor configured to receive the video stream, access the computer program code, and operate as instructed by the computer program code, wherein the computer program code includes reconstructing code configured to cause the at least one processor to reconstruct a cell from among at least one cell of the video stream. The reconstructing code includes: obtaining code configured to cause the at least one processor to obtain a maximum difference value for each of at least one set of attribute values of the cell; and determining code configured to cause the at least one processor to determine whether to apply a filter to the cell based on the maximum difference value of a set of attribute values of the at least one set of attribute values.

According to an embodiment, the determining code is configured to cause the at least one processor to apply the filter to the cell based on the maximum difference value being less than a threshold.

According to an embodiment, values of the set of attribute values are luma values of the cell.

According to an embodiment, the at least one set of attribute values is a plurality of sets of attribute values, each set of the plurality of sets of attribute values corresponding to a different color component, the obtaining code is configured to cause the at least one processor to obtain a plurality of maximum difference values for the plurality of sets of attribute values, respectively, and the determining code is configured to cause the at least one processor to determine a largest maximum difference value from among the plurality of maximum difference values, and determine whether to apply the filter to the cell based on the largest maximum difference value.

According to an embodiment, the determining code is configured to cause the at least one processor to apply the filter to the cell based on the largest maximum difference value being less than a threshold.

According to an embodiment, the determining code includes selecting code configured to cause the at least one processor to select the filter from among a plurality of filters based on a median value of attribute values of a cell neighborhood that includes the cell that has the set of attribute values.

According to an embodiment, the determining code includes selecting code configured to cause the at least one processor to select a filter strength of the filter based on the maximum difference value.

According to an embodiment, the filter is a bilateral filter.

According to an embodiment, the filter is a trilinear filter.

According to one or more embodiments, a non-transitory computer-readable medium storing computer instructions is provided. The computer instructions, when executed by at least one processor, cause the at least one processor to: reconstruct a cell from among at least one cell of a video stream, including: obtaining a maximum difference value for each of at least one set of attribute values of the cell; and determining whether to apply a filter to the cell based on the maximum difference value of a set of attribute values of the at least one set of attribute values.

BRIEF DESCRIPTION OF THE DRAWINGS

Further features, the nature, and various advantages of embodiments of the disclosed subject matter will be more apparent from the following detailed description and the accompanying drawings in which.

DETAILED DESCRIPTION

A point cloud is a set of points in a 3D space, each with associated attributes, e.g. color, material properties, etc. Point clouds can be used to reconstruct an object or a scene as a composition of such points. They can be captured using multiple cameras and depth sensors in various setups and may be made up of thousands up to billions of points in order to realistically represent reconstructed scenes.

Compression technologies are needed to reduce the amount of data required to represent a point cloud. As such, technologies may be needed for lossy compression of point clouds for use in real-time communications and six Degrees of Freedom (DoF) virtual reality. In addition, technology is sought for lossless point cloud compression in the context of dynamic mapping for autonomous driving and cultural heritage applications, etc. MPEG has started working on a standard to address compression of geometry and attributes such as colors and reflectance, scalable/progressive coding, coding of sequences of point clouds captured over time, and random access to subsets of the point cloud.

The main philosophy behind video-based point cloud compression (V-PCC) is to leverage existing video codecs to compress the geometry, occupancy, and texture of a dynamic point cloud as three separate video sequences. The extra metadata needed to interpret the three video sequences may be compressed separately. A small portion of the overall bitstream is the metadata, which could be encoded/decoded efficiently using software implementation. The bulk of the information may be handled by the video codec.

With reference to FIGS. 1-4, an embodiment of the present disclosure for implementing encoding and decoding structures of the present disclosure are described. The encoding and decoding structures of the present disclosure may implement aspects of V-PCC described above.

Figure 1:
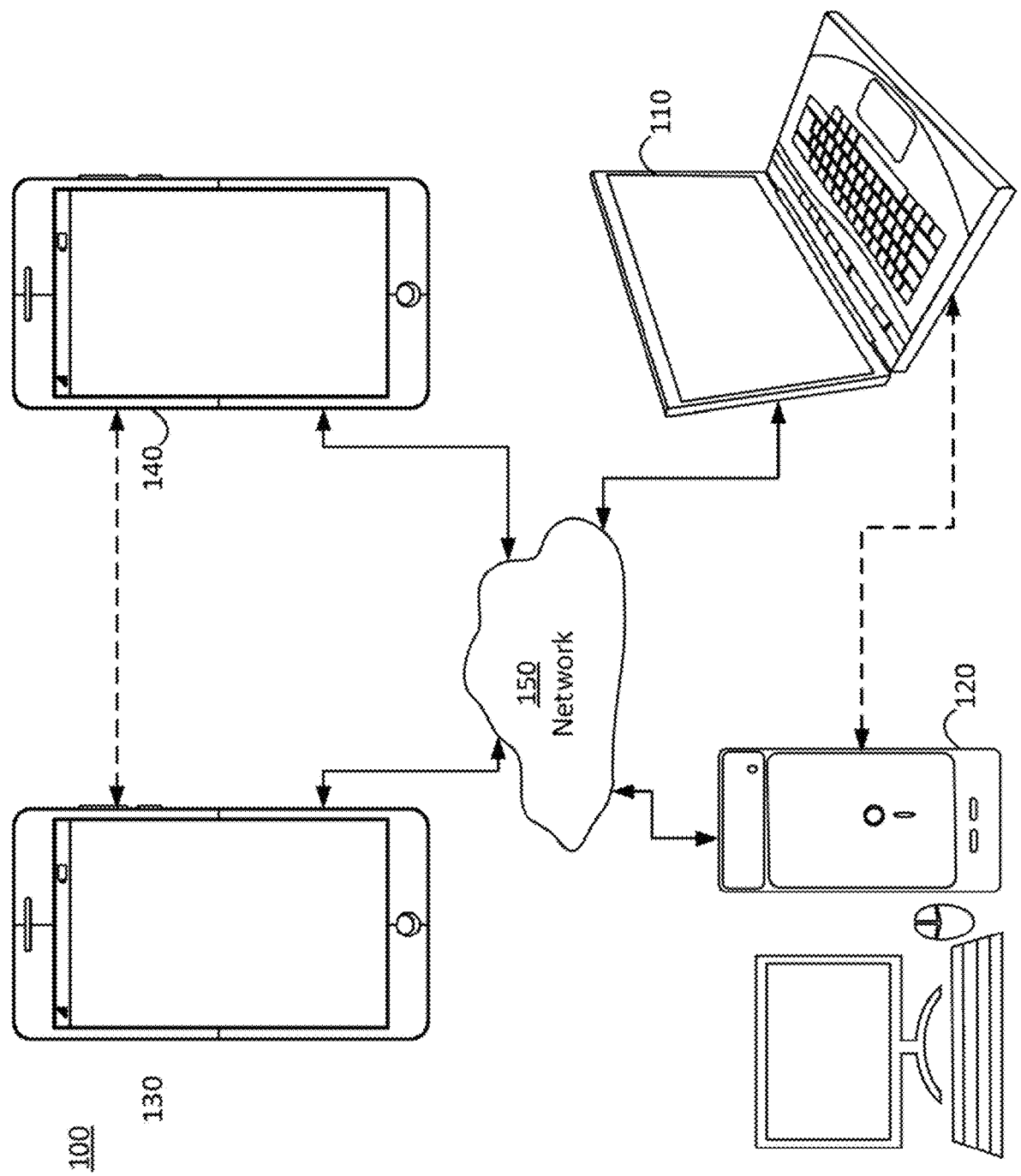
FIG. 1 is a schematic illustration of a simplified block diagram of a communication system in accordance with an embodiment.

FIG. 1 illustrates a simplified block diagram of a communication system 100 according to an embodiment of the present disclosure. The system 100 may include at least two terminals 110, 120 interconnected via a network 150. For unidirectional transmission of data, a first terminal 110 may code video data at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be, for example, servers, personal computers, and smart phones, and/or any other type of terminal. For example, the terminals (110-140) may be laptop computers, tablet computers, media players and/or dedicated video conferencing equipment. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

Figure 2:
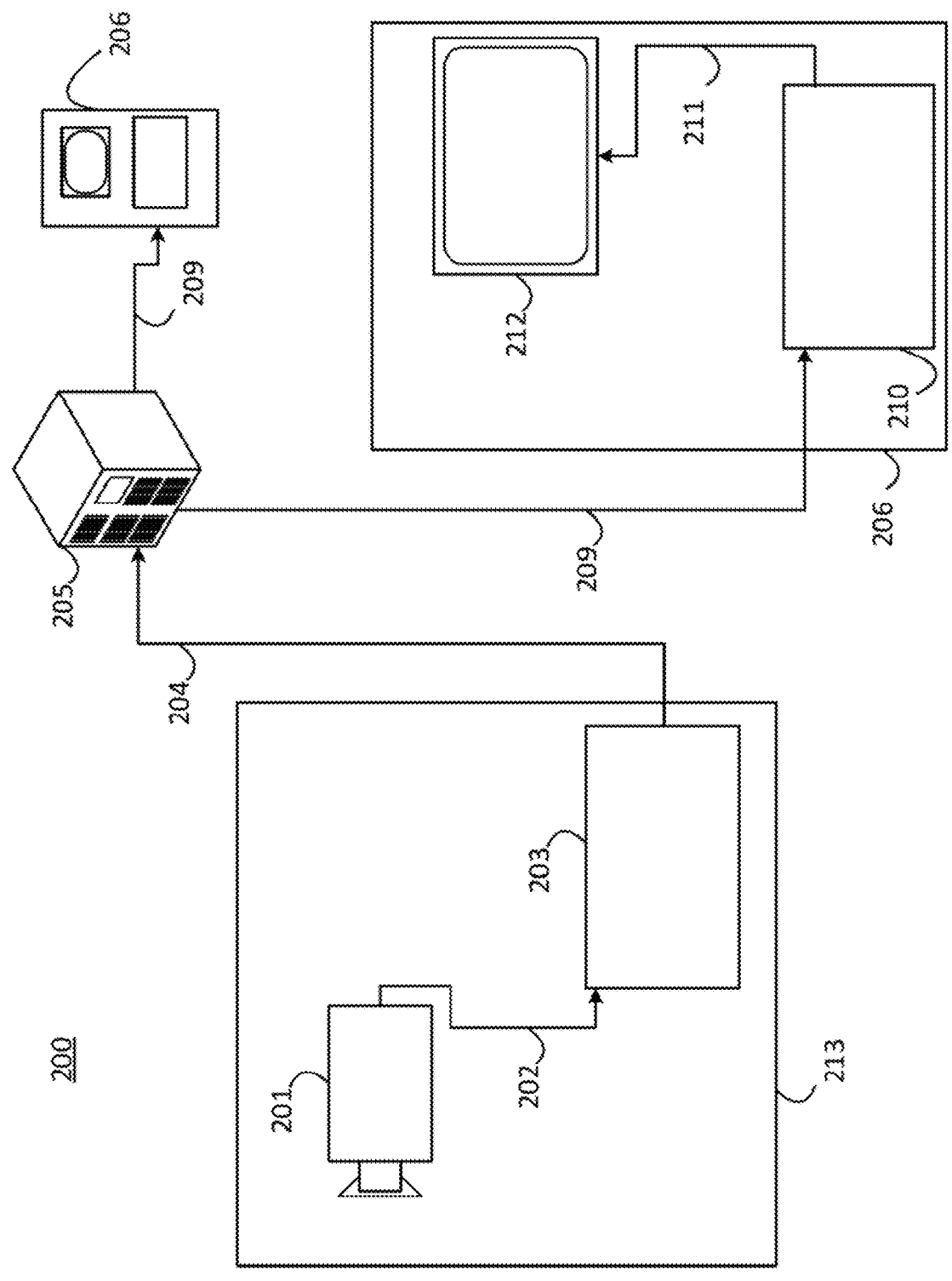
FIG. 2 is a schematic illustration of a simplified block diagram of a streaming system in accordance with an embodiment.

FIG. 2 illustrates, as an example of an application for the disclosed subject matter, a placement of a video encoder and decoder in a streaming environment. The disclosed subject matter can be used with other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that includes a video source 201 and an encoder 203. The streaming system 200 may further include at least one streaming server 205 and/or at least one streaming client 206.

The video source 201 can create, for example, a stream 202 that includes a 3D point cloud corresponding to a 3D video. The video source 201 may include, for example, 3D sensors (e.g. depth sensors) or 3D imaging technology (e.g. digital camera(s)), and a computing device that is configured to generate the 3D point cloud using the data received from the 3D sensors or the 3D imaging technology. The sample stream 202, which may have a high data volume when compared to encoded video bitstreams, can be processed by the encoder 203 coupled to the video source 201. The encoder 203 can include hardware, software, or a combination thereof to enable or implement aspects of the disclosed subject matter as described in more detail below. The encoder 203 may also generate an encoded video bitstream 204. The encoded video bitstream 204, which may have e a lower data volume when compared to the uncompressed stream 202, can be stored on a streaming server 205 for future use. One or more streaming clients 206 can access the streaming server 205 to retrieve video bit streams 209 that may be copies of the encoded video bitstream 204.

The streaming clients 206 can include a video decoder 210 and a display 212. The video decoder 210 can, for example, decode video bitstream 209, which is an incoming copy of the encoded video bitstream 204, and create an outgoing video sample stream 211 that can be rendered on the display 212 or another rendering device (not depicted). In some streaming systems, the video bitstreams 204, 209 can be encoded according to certain video coding/compression standards. Examples of such standards include, but are not limited to, ITU-T Recommendation H.265, Versatile Video Coding (VVC), and MPEG/V-PCC.

Figure 3:
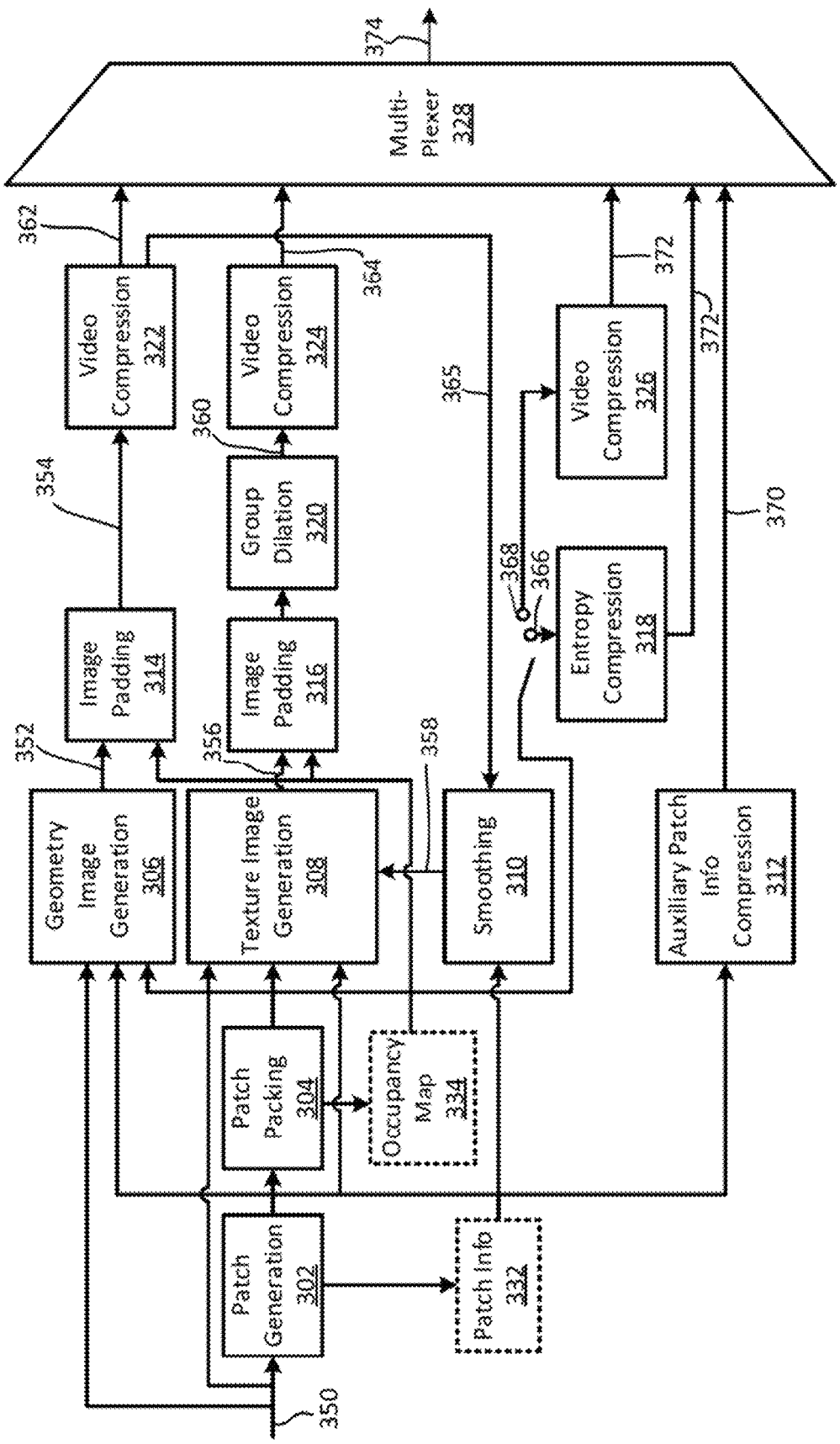
FIG. 3 is a schematic illustration of a simplified block diagram of a video encoder in accordance with an embodiment.
Figure 4:
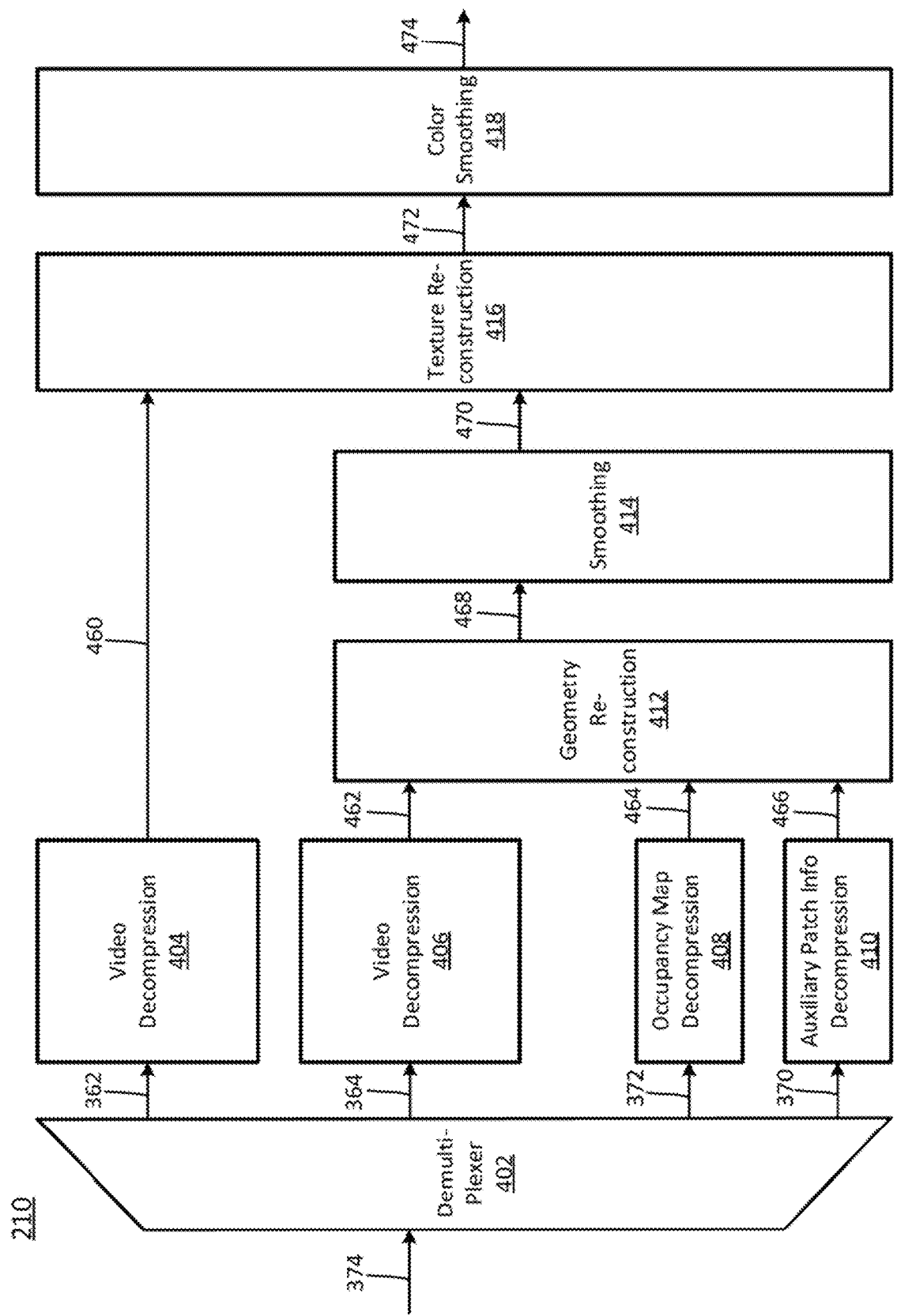
FIG. 4 is a schematic illustration of a simplified block diagram of a video decoder in accordance with an embodiment.

With reference to FIGS. 3-4, some aspects of V-PCC that may be performed by embodiments of the present disclosure are described below.

FIG. 3 illustrates an example functional block diagram of a video encoder 203 according to an embodiment of the present disclosure.

As illustrated in FIG. 3, the video encoder 203 may receive a point cloud frame(s) 350, and generate a geometry image 352, a texture image 356, and an occupancy map 334 based on the point cloud frame 350. The video encoder 203 may compress the geometry image 352 into a compressed geometry image 362, the texture image 356 into a compressed texture image 364, and the occupancy map 334 into a compressed occupancy map 372. A multiplexer 328 of the video encoder 203 may form a compressed bitstream 374 that includes the compressed geometry image 362, the compressed texture image 364, and the compressed occupancy map 372.

More specifically, in embodiments, the video encoder 203 may include a patch generation module 302 that segments the point cloud frame 350 into patches. Patches are useful entities of V-PCC. The patch generation process includes decomposing the point cloud frame 350 into a minimum number of patches with smooth boundaries, while also minimizing the reconstruction error. Encoders of the present disclosure may implement various methods to generate such a decomposition.

The video encoder 203 may include a patch packing module 304 that performs a packing process. The packing process includes mapping the extracted patches onto a 2D grid while minimizing the unused space and guaranteeing that every M×M (e.g., 16×16) block of the grid is associated with a unique patch. Efficient patch packing directly impacts the compression efficiency either by minimizing the unused space or ensuring temporal consistency. The patch packing module 304 may generate the occupancy map 334.

The video encoder 203 may include a geometry image generation module 306 and a texture image generation module 308. In order to better handle the case of multiple points being projected to the same sample, each patch may be projected onto two images, referred to as layers. For example, the geometry image generation module 306 and the texture image generation module 308 may exploit the 3D to 2D mapping computed during the packing process of the patch packing module 304 to store the geometry and texture of the point cloud as images (a.k.a. layers). The generated images/layers may be stored as a video frame(s) and compressed using a video codec (e.g. HM video codec) according to configurations provided as parameters.

Figure 6:
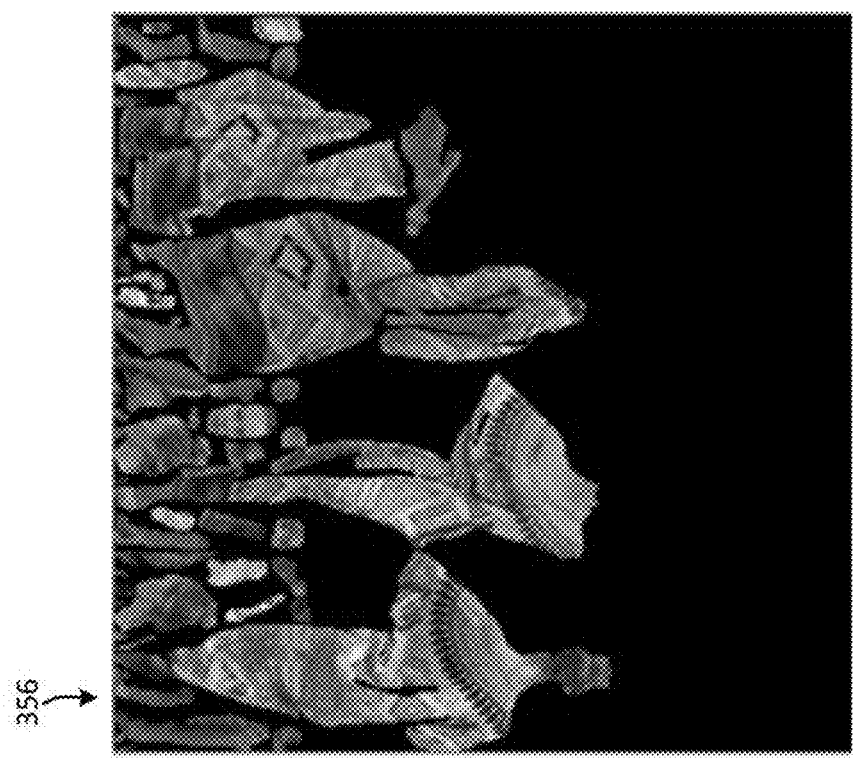
FIG. 6 illustrates an example of a texture image in accordance with an embodiment.
Figure 5:
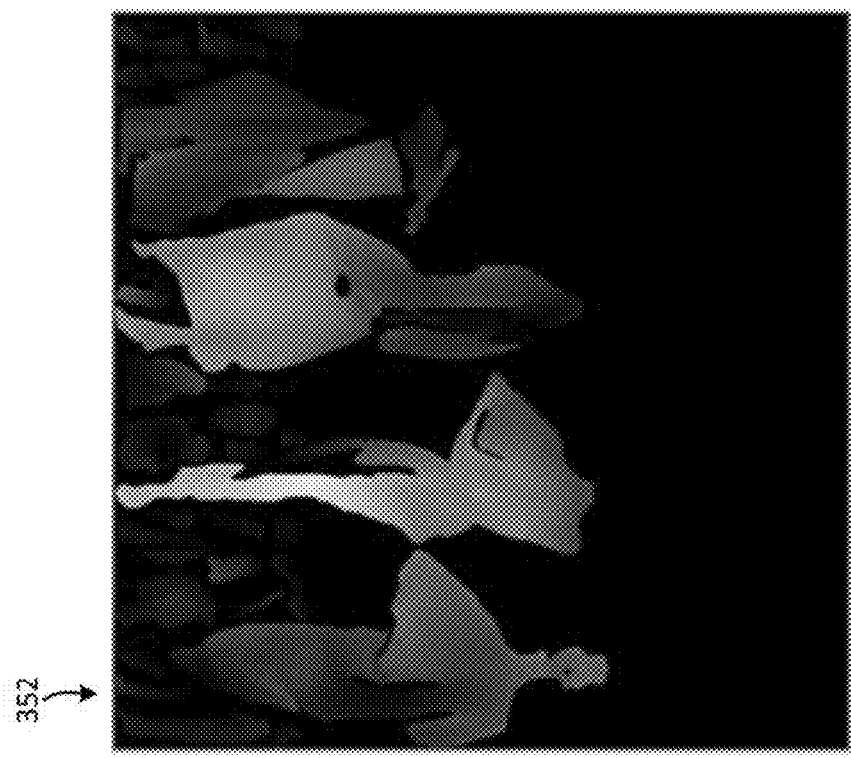
FIG. 5 illustrates an example of a geometry image in accordance with an embodiment.

In embodiments, the geometry image generation module 306 generates the geometry image 352 and the texture image generation module 308 generates the texture image 356, based on the input point cloud frame 350 and the occupancy map 334. An example of the geometry image 352 is illustrated in FIG. 5 and an example of the texture image 356 is illustrated in FIG. 6. In an embodiment, the geometry image 352 may be represented by a monochromatic frame of W×H in YUV420-8 bit format. In an embodiment, the occupancy map 334 image consists of a binary map that indicates for each cell of the grid whether it belongs to the empty space or to the point cloud. To generate the texture image 356, the texture image generation module 308 may exploit the reconstructed/smoothed geometry 358 in order to compute the colors to be associated with the re-sampled points.

The video encoder 203 may also include an image padding module 314 and an image padding module 316 for padding the geometry image 352 and the texture image 356, respectively, to form a padded geometry image 354 and a padded texture image 360. The image padding (a.k.a. background filling) simply fills unused space of the images with redundant information. A good background filling is a one that minimally increases the bit rate while does not introduce significant coding distortion around the patch boundaries. The image padding module 314 and the image padding module 316 may use the occupancy map 334 to form the padded geometry image 354 and the padded texture image 360, respectively. In an embodiment, the video encoder 203 may include a group dilation module 320 to form the padded texture image 360.

The video encoder 203 may include a video compression module 322 and a video compression module 324 for compressing the padded geometry image 354 and the padded texture image 360 into the compressed geometry image 362 and the compressed texture image 364, respectively.

The video encoder 203 may include an entropy compression module 318 for lossless encoding 366 of the occupancy map 334 and a video compression module 326 for lossy encoding 368 of the occupancy map 334.

In embodiments, the video encoder 203 may include a smoothing module 310 for generating smoothed geometry 358 by using a reconstructed geometry image 365, provided by the video compression module 322, and patch info 332. The smoothing procedure of the smoothing module 310 may aim at alleviating potential discontinuities that may arise at the patch boundaries due to compression artifacts. The smoothed geometry 358 may be used by the texture image generation module 308 to generate the texture image 356.

The video encoder 203 may also include an auxiliary patch information compression module 312 for forming compressed auxiliary patch information 370 that is provided in the compressed bitstream 374 by the multiplexer 328.

FIG. 4 illustrates an example functional block diagram of a video decoder 210 according to an embodiment of the present disclosure.

As illustrated in FIG. 4, the video decoder 210 may receive the coded bitstream 374 from the video encoder 203 to obtain the compressed texture image 362, the compressed geometry image 364, the compressed occupancy map 372, and the compressed auxiliary patch information 370. The video decoder 210 may decode the compressed texture image 362, the compressed geometry image 364, the compressed occupancy map 372, and the compressed auxiliary patch information 370 to obtain a decompressed texture image 460, a decompressed geometry image 462, a decompressed occupancy map 464, and decompressed auxiliary patch information 466, respectively. Following, the video decoder 210 may generate a reconstructed point cloud 474 based on the decompressed texture image 460, the decompressed geometry image 462, the decompressed occupancy map 464, and the decompressed auxiliary patch information 466.

In embodiments, the video decoder 210 may include a demultiplexer 402 that separates the compressed texture image 362, the compressed geometry image 364, the compressed occupancy map 372, and the compressed auxiliary patch information 370 of the compressed bitstream 374 received.

The video decoder 210 may include a video decompression module 404, a video decompression module 406, an occupancy map decompression module 408, and an auxiliary patch information decompression module 510 that decode the compressed texture image 362, the compressed geometry image 364, the compressed occupancy map 372, and the compressed auxiliary patch information 370, respectively.

The video decoder 210 may include a geometry reconstruction module 412 that obtains reconstructed (three dimensional) geometry 468 based on the decompressed geometry image 462, the decompressed occupancy map 464, and the decompressed auxiliary patch information 466.

The video decoder 210 may include a smoothing module 414 that smooths the reconstructed geometry 468 to obtain smoothed geometry 470. The smoothing procedure may aim at alleviating potential discontinuities that may arise at the patch boundaries due to compression artifacts.

The video decoder 210 may include a texture reconstruction module 416 for obtaining reconstructed texture 472 based on the decompressed texture image 460 and the smoothed geometry 470.

The video decoder 210 may include a color smoothing module 418 that smooths the color of the reconstructed texture 472 to obtain a reconstructed point cloud 474. Non-neighboring patches in 3D space are often packed next to each other in 2D videos. This implies that pixel values from non-neighboring patches might be mixed up by the block-based video codec. The color smoothing of the color smoothing module 418 may aim to reduce the visible artifacts that appear at patch boundaries.

As described above, an input cloud may be segmented into several patches and packed into three 2D images, such as an occupancy map, geometry image, and texture image. These images are then compressed by a coding standard such as, for example, HEVC.

In comparative art V-PCC design, color smoothing is performed after reconstruction based on a conditional check that the color values in the target area of smoothing are homogeneous. The comparative art V-PCC design uses a formula based upon calculation of the entropy of the color values in the surrounding area of each point to be smoothed, which can be expensive in terms of computational or memory requirements.

Embodiments of the present disclosure that provide an improvement over the comparative art V-PCC design. For example, embodiments of the present disclosure may provide a method of performing said homogeneity check with low computational complexity and no (or low) memory requirements.

Embodiments of the present disclosure may be used separately or combined in any order. Further, each of the embodiments of the present disclosure, including methods, encoders, and decoders, may be implemented by processing circuitry (e.g., one or more processors or one or more integrated circuits). In embodiments, one or more processors may execute a program that is stored in a non-transitory computer-readable medium to perform the functions of methods, encoders, and decoders of the present disclosure.

In a V-PCC decoding process, an attribute smoothing process may be invoked to apply trilinear filtering on the reconstructed color values for the points belonging to a grid-cell, which may be a filtering unit. The grid-cell (or cell) may be one of a plurality of cells that three-dimensional geometry coordinate space (e.g. a point cloud) is divided into.

Inputs of the attribute smoothing process may include, for example, (1) an occupancy map corresponding to the current point cloud frame at nominal resolution; (2) an attribute index; (3) number of components corresponding to the attribute index; (4) an attribute smoothing control parameter set; (5) an array containing reconstructed attribute values for attribute index; (6) an array containing reconstructed (possibly smoothed) positions; and (7) patch index information corresponding to each point in the array containing reconstructed (possibly smoothed) reconstructed positions. The output of the attribute smoothing process may include, for example, an array containing reconstructed smoothed attribute values for the attribute index.

As a step (e.g. final step) of a decoding process, a decision may be made, by embodiments of the present disclosure, whether to apply a filter (e.g. tri-linear filter) based upon two criteria (e.g. distortion criteria). In a case where the distortion criteria are both satisfied, the output of the filter may be added to the syntax element "recPCaSmOut", which may be the output of the attribute smoothing process. The two criteria may be as follows.

(First Criteria) The variable "distToCentroid2", which may be defined as abs(Ycell−Ycur)*10, is greater than a threshold (e.g. "afp_attribute_smoothing_threshold_smoothing[aIdx]").

"Ycell" and "Ycur" may be the luma values of the centroid of points in the current cell ("attrCentroid") and the current point ("pointAttr"), respectively. "aIdx" may be an attribute index.

(Second Criteria) The entropy of the luma values in the cell that contains the current entry from "recPCAttrSmIn[aIdx][i][j]" is less than a threshold (e.g. less than "afp_attribute_smoothing_threshold_local_entropy[aIdx]".

"recPCAttrSmIn[aIdx][i][j]" may be an array containing reconstructed attribute values for attribute index "aIdx", wherein 0≤i<"PointCnt" and 0≤j<"numComps". The value of "PointCnt" may be number of points in the reconstructed point cloud. The value of "numComps" may be the number of components corresponding to the attribute index "aIdx".

Regarding the second criteria, the luma entropy of the points in a cell may be computed by embodiments of the present disclosure as follows:

$$h = -\sum_{i=0}^{255} p_i * \log_2(p_i),$$

The symbol $p_i$ may denote the probability of luma taking the value i and h denotes the luma entropy in the cell. Embodiments of the present disclosure may compute the probability from the distribution of luma values in the range of 0 to 255 in the cell that contains the current entry from the syntax element "recPCAttrSmIn[aIdx][i][j]".

The above process, by checking whether the second criteria is satisfied, may measure the homogeneity of the attribute values in the cell so that over-smoothing can be avoided for homogeneous areas.

The above process may entail either direct calculation of entropy (e.g. luma entropy) using 255 histogram bins for each grid-cell or a certain approximation of the entropy.

Instead of the second criteria described above, embodiments of the present disclosure may determine whether a modified second criteria is satisfied for determining whether the filter is to be applied. For example, the modified second criteria of embodiments may be that the maximum absolute difference of attribute values in the cell is less than a threshold. Embodiments of the present disclosure may define the syntax element "maxDiff" as the maximum absolute difference of attribute values in the cell. The below TABLE 1 provides example c++ code of an embodiment of the present disclosure for obtaining the value of the syntax element "maxDiff".

TABLE 1

```
uint8_t minValue = 0;
uint8_t maxValue = 0;
for ( size_t i = 0; i < neighborCount; ++i ) {
    const uint8_t luma = Lum[i];
    if ( i == 0 || luma < minValue ) { minValue = luma; }
    if ( i == 0 || luma > maxValue ) { maxValue = luma; }
}
const int64_t maxDiff = maxValue - minValue;
```

In another embodiment of the present disclosure, more channels than luma can be used by extending the above "maxDiff" definition. As an example, three maximum absolute difference values (e.g. three of "maxDiff") may be calculated for a cell, wherein each is a maximum absolute difference value of a respective color component of the cell. In an embodiment, the maximum value of the three maximum absolute difference values for three color components can be used as a single measure for homogeneity check. For example, the modified second criteria may be satisfied when the largest of the three maximum absolute difference values is less than a threshold.

In another embodiment of the present disclosure, the check of the "maxDiff" value may be used to decide the type of filtering when using multiple point attribute values in a local window for color-transfer in, for example, V-PCC or G-PCC. In such cases, embodiments of the present disclosure can choose the median of the attribute values in the cell neighborhood (e.g. a group of cells) based on "maxDiff" being larger than a threshold and the average of the attribute values being equal to or smaller than the threshold. In an embodiment, a filter may be selected from among a plurality of filters based on a median value and/or average value of attribute values of a cell neighborhood.

In another embodiment of the present disclosure, the check of the "maxDiff" value can be used in post-filtering processes such as bilateral filtering of reconstructed attribute values for G-PCC. In this case, embodiments of the present disclosure may skip the filtering in an area of high variability indicated by a large value of "maxDiff" of the area, or adjust the filtering strength of the area based on the value of "maxDiff" in an adaptive manner. For example, in an embodiment, filtering of the area may not be performed if the value of "maxDiff" of the area is larger than a threshold. Alternatively or additionally, the embodiment may provide different filtering strengths of the area depending on the particular value of "maxDiff."

In embodiments, a device 500 may comprise memory storing computer program code that, when performed by at least one processor, may cause an at least one processor to perform the functions of the decoders and encoders described above.

Figure 7:
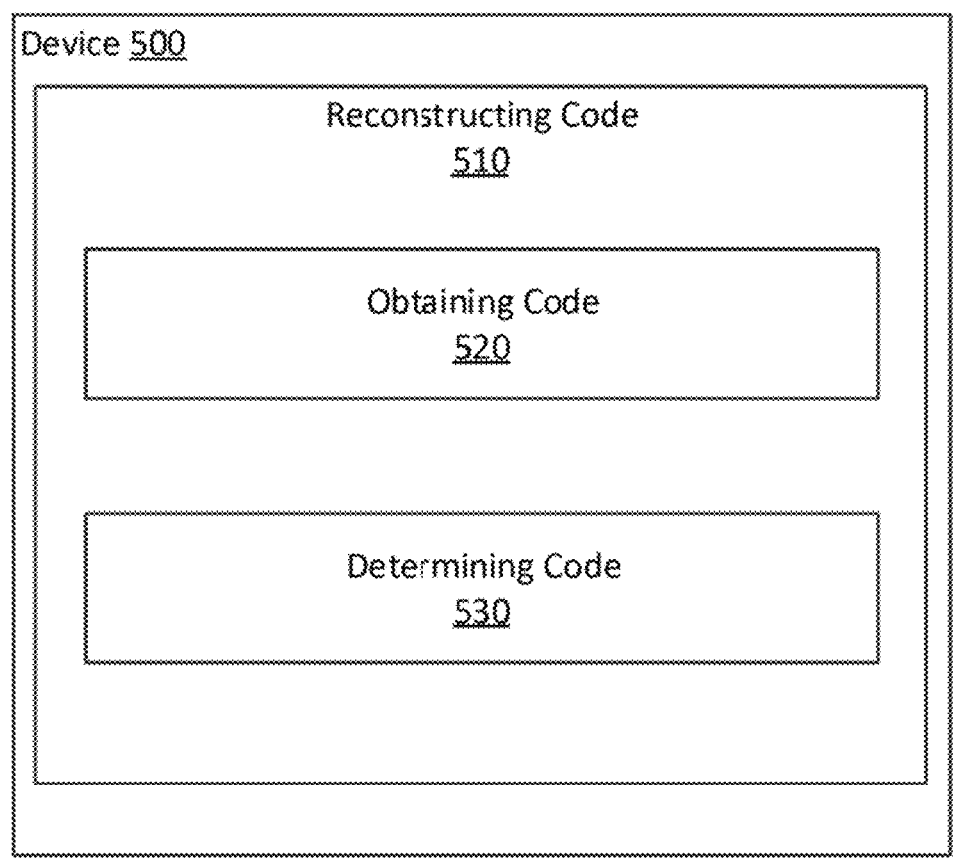
FIG. 7 is a diagram illustrating a device in accordance with an embodiment.

For example, with reference to FIG. 7, the computer program code of the device 500 may comprise reconstructing code 510. The reconstructing code 510 may be configured to cause the at least one processor to reconstruct one or more cells of a video stream including, for example, a color smoothing process.

The reconstructing code 510 may include obtaining code 520 and determining code 530. The obtaining code 520 may be configured to cause the at least one processor to obtain one or more maximum difference values of any number of sets of attribute values of any number of the one or more cells. The determining code 530 may be configured to cause the at least one processor to determine whether to apply a filter to any number of the one or more cells (including only to one or more portions thereof) based on the one or more maximum difference values obtained. For example, the determining code 530 may be configured to cause the at least one processor to apply a filter to any number of the one or more cells based on comparing any number of the one or more maximum difference values to a threshold. According to embodiments, the determining code 530 may be configured to cause the at least one processor to determine a largest maximum difference value from among a plurality of the maximum difference values, and determine whether to apply the filter based on the largest maximum difference value. According to embodiments, the determining code 530 may be configured to cause the at least one processor to select the filter that is to be applied from among a plurality of filters and/or a filter strength of the filter based on the one or more maximum difference values obtained and/or a mean value(s) of attribute values of any number of the one or more cells, and/or a median value(s) of attribute values of the one or more cells.

The techniques, described above, can be implemented in a video encoder and/or decoder adapted for point cloud compression/decompression. The encoder and/or decoder can be implemented in hardware, software, or any combination thereof, and the software, if any, can be stored in one or more non-transitory computer readable media.

The techniques, described above, can be implemented as computer software using computer-readable instructions and physically stored in one or more computer-readable media. For example, FIG. 8 shows a computer system 900 suitable for implementing certain embodiments of the disclosure.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 8:
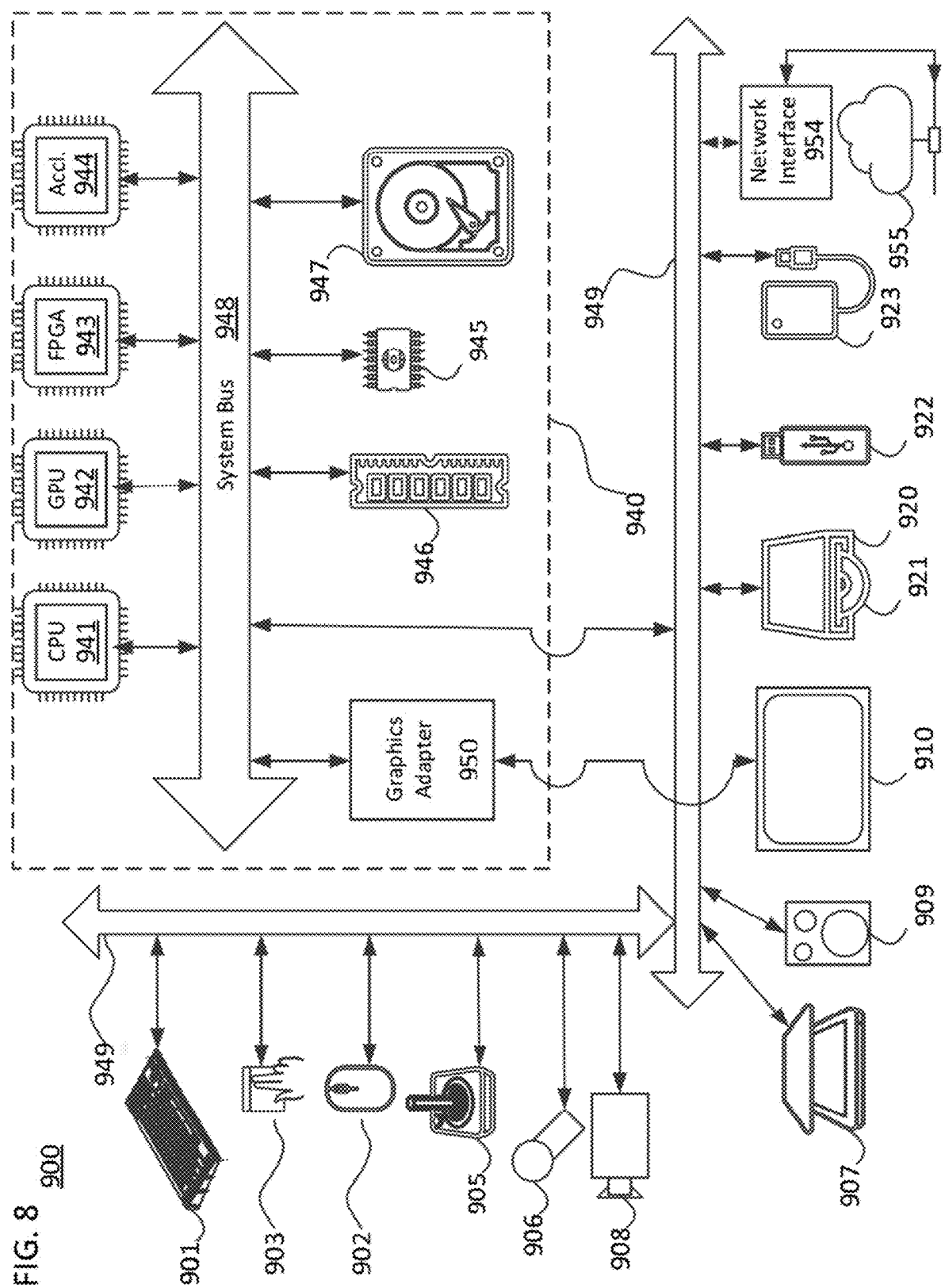
FIG. 8 is a diagram of a computer system suitable for implementing embodiments.

The components shown in FIG. 8 for computer system 900 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 900.

Computer system 900 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 901, mouse 902, trackpad 903, touch screen 910, data-glove, joystick 905, microphone 906, scanner 907, camera 908.

Computer system 900 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 910, data glove, or joystick 905, but there can also be tactile feedback devices that do not serve as input devices). For example, such devices may be audio output devices (such as: speakers 909, headphones (not depicted)), visual output devices (such as screens 910 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 900 can also include human accessible storage devices and their associated media such as optical media including CD/DVD ROM/RW 920 with CD/DVD or the like media 921, thumb-drive 922, removable hard drive or solid state drive 923, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 900 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 949 (such as, for example USB ports of the computer system 900; others are commonly integrated into the core of the computer system 900 by attachment to a system bus as described below (for example Ethernet interface into a PC computer system or cellular network interface into a smartphone computer system). Using any of these networks, computer system 900 can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment 955. Certain protocols and protocol stacks can be used on each of those networks and network interfaces as described above.

Aforementioned human interface devices, human-accessible storage devices, and network interfaces 954 can be attached to a core 940 of the computer system 900.

The core 940 can include one or more Central Processing Units (CPU) 941, Graphics Processing Units (GPU) 942, specialized programmable processing units in the form of Field Programmable Gate Areas (FPGA) 943, hardware accelerators for certain tasks 944, and so forth. These devices, along with Read-only memory (ROM) 945, Random-access memory 946, internal mass storage such as internal non-user accessible hard drives, SSDs, and the like 947, may be connected through a system bus 948. In some computer systems, the system bus 948 can be accessible in the form of one or more physical plugs to enable extensions by additional CPUs, GPU, and the like. The peripheral devices can be attached either directly to the core's system bus 948, or through a peripheral bus 949. Architectures for a peripheral bus include PCI, USB, and the like. A graphics adapter 950 may be included in the core 940.

CPUs 941, GPUs 942, FPGAs 943, and accelerators 944 can execute certain instructions that, in combination, can make up the aforementioned computer code. That computer code can be stored in ROM 945 or RAM 946. Transitional data can be also be stored in RAM 946, whereas permanent data can be stored for example, in the internal mass storage 947. Fast storage and retrieve to any of the memory devices can be enabled through the use of cache memory, that can be closely associated with one or more CPU 941, GPU 942, mass storage 947, ROM 945, RAM 946, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 900, and specifically the core 940 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 940 that are of non-transitory nature, such as core-internal mass storage 947 or ROM 945. The software implementing various embodiments of the present disclosure can be stored in such devices and executed by core 940. A computer-readable medium can include one or more memory devices or chips, according to particular needs. The software can cause the core 940 and specifically the processors therein (including CPU, GPU, FPGA, and the like) to execute particular processes or particular parts of particular processes described herein, including defining data structures stored in RAM 946 and modifying such data structures according to the processes defined by the software. In addition or as an alternative, the computer system can provide functionality as a result of logic hardwired or otherwise embodied in a circuit (for example: accelerator 944), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method for decoding a video stream by at least one processor, the method comprising:
   receiving the video stream, the video stream including at least one cell; and
   reconstructing a current cell from among the at least one cell, the reconstructing comprising:
      obtaining a maximum difference value for each of at least one set of attribute values of the current cell; and
      determining whether to apply a filter to the current cell based on the maximum difference value of a set of attribute values of the at least one set of attribute values,
   wherein the maximum difference value of the set of attribute values is a difference between a maximum attribute value of the set of attribute values of the current cell and a minimum attribute value of the set of attribute values of the current cell.

2. The method of claim 1, wherein
the determining comprises applying the filter to the current cell based on the maximum difference value being less than a threshold.

3. The method of claim 1, wherein values of the set of attribute values are luma values of the current cell.

4. The method of claim 1, wherein
the at least one set of attribute values is a plurality of sets of attribute values, each set of the plurality of sets of attribute values corresponding to a different color component,
the obtaining comprises obtaining a plurality of maximum difference values for the plurality of sets of attribute values, respectively, and
the determining comprises determining a largest maximum difference value from among the plurality of maximum difference values, and whether to apply the filter to the current cell based on the largest maximum difference value.

5. The method of claim 4, wherein
the determining comprises applying the filter to the current cell based on the largest maximum difference value being less than a threshold.

6. The method of claim 1, wherein
the determining comprises selecting the filter from among a plurality of filters based on a median value of attribute values of a cell neighborhood that includes the current cell that has the set of attribute values.

7. The method of claim 1, wherein
the determining comprises selecting a filter strength of the filter based on the maximum difference value.

8. The method of claim 7, wherein
the filter is a bilateral filter.

9. The method of claim 1, wherein
the filter is a trilinear filter.

10. The method of claim 1, wherein
the determining comprises determining to apply the filter to a current point of the current cell based on both the maximum difference value being less than a first threshold and an absolute distance, between a centroid of points in the current cell and the current point, being greater than a second threshold.

11. A system for decoding a video stream, the system comprising:
   memory configured to store computer program code; and
   at least one processor configured to receive the video stream, access the computer program code, and operate as instructed by the computer program code, wherein the computer program code comprises reconstructing code configured to cause the at least one processor to reconstruct a current cell from among at least one cell of the video stream, the reconstructing code comprising:
      obtaining code configured to cause the at least one processor to obtain a maximum difference value for each of at least one set of attribute values of the current cell; and
      determining code configured to cause the at least one processor to determine whether to apply a filter to the current cell based on the maximum difference value of a set of attribute values of the at least one set of attribute values,
   wherein the maximum difference value of the set of attribute values is a difference between a maximum attribute value of the set of attribute values of the current cell and a minimum attribute value of the set of attribute values of the current cell.

12. The system of claim 11, wherein
the determining code is configured to cause the at least one processor to apply the filter to the current cell based on the maximum difference value being less than a threshold.

13. The system of claim 11, wherein values of the set of attribute values are luma values of the current cell.

14. The system of claim 11, wherein
the at least one set of attribute values is a plurality of sets of attribute values, each set of the plurality of sets of attribute values corresponding to a different color component,
the obtaining code is configured to cause the at least one processor to obtain a plurality of maximum difference values for the plurality of sets of attribute values, respectively, and
the determining code is configured to cause the at least one processor to determine a largest maximum difference value from among the plurality of maximum difference values, and determine whether to apply the filter to the current cell based on the largest maximum difference value.

15. The system of claim 14, wherein the determining code is configured to cause the at least one processor to apply the filter to the current cell based on the largest maximum difference value being less than a threshold.

16. The system of claim 11, wherein the determining code comprises selecting code configured to cause the at least one processor to select the filter from among a plurality of filters based on a median value of attribute values of a cell neighborhood that includes the current cell that has the set of attribute values.

17. The system of claim 11, wherein the determining code comprises selecting code configured to cause the at least one processor to select a filter strength of the filter based on the maximum difference value.

18. The system of claim 17, wherein the filter is a bilateral filter.

19. The system of claim 11, wherein the filter is a trilinear filter.

20. A non-transitory computer-readable medium storing computer instructions that, when executed by at least one processor, cause the at least one processor to:
reconstruct a current cell from among at least one cell of a video stream, including:
obtaining a maximum difference value for each of at least one set of attribute values of the current cell; and
determining whether to apply a filter to the current cell based on the maximum difference value of a set of attribute values of the at least one set of attribute values,
wherein the maximum difference value of the set of attribute values is a difference between a maximum attribute value of the set of attribute values of the current cell and a minimum attribute value of the set of attribute values of the current cell.

* * * * *